United States Patent
Ikusawa

(10) Patent No.: US 10,237,430 B2
(45) Date of Patent: Mar. 19, 2019

(54) IMAGE FORMING APPARATUS AND NON-TRANSITORY RECORDING MEDIUM STORING PRINT CONTROL PROGRAM

(71) Applicant: KONICA MINOLTA, INC., Chiyoda-ku, Tokyo (JP)

(72) Inventor: Takeshi Ikusawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/918,590

(22) Filed: Mar. 12, 2018

(65) Prior Publication Data

US 2018/0270376 A1    Sep. 20, 2018

(30) Foreign Application Priority Data

Mar. 17, 2017    (JP) .................................. 2017-052301

(51) Int. Cl.
*H04N 1/00*    (2006.01)

(52) U.S. Cl.
CPC ..... *H04N 1/00623* (2013.01); *H04N 1/00039* (2013.01); *H04N 1/00042* (2013.01); *H04N 1/00076* (2013.01); *H04N 1/00082* (2013.01); *H04N 1/00477* (2013.01); *H04N 1/00954* (2013.01)

(58) Field of Classification Search
CPC .................................................. H04N 1/00623
See application file for complete search history.

(56) References Cited

U.S. PATENT DOCUMENTS

| 4,008,957 A * | 2/1977 | Summers ........... G03G 15/6508 271/9.11 |
| 6,125,242 A * | 9/2000 | Yamada ..................... B41J 3/60 399/23 |
| 6,567,620 B2 * | 5/2003 | Brown, Jr. ............. G03G 15/50 399/18 |
| 7,542,687 B2 * | 6/2009 | Ai ..................... G03G 15/6508 399/23 |

(Continued)

FOREIGN PATENT DOCUMENTS

| JP | 09081344 A | 3/1997 |
| JP | 2000281243 A | 10/2000 |

(Continued)

*Primary Examiner* — Ted W Barnes
(74) *Attorney, Agent, or Firm* — Holtz, Holtz & Volek PC

(57) ABSTRACT

Provided are an image forming apparatus including multiple feed trays and a non-transitory recording medium. One or more hardware processors of the image forming apparatus determine, for each print product to be printed, whether the amount of sheets contained at the beginning of printing the each print product in a feed tray being used for printing, is not less than the necessary amount of sheets for printing the each print product, and cause a print engine to print the print products. In printing the print products, the one or more hardware processors, when determining that the amount of sheets in the feed tray being used for printing, determined for a next print product, which is to be printed next to a print product currently being printed, is less than the necessary amount of sheets for the next print product, cause the print engine to suspend printing the next print product.

24 Claims, 12 Drawing Sheets

(56) References Cited

U.S. PATENT DOCUMENTS

| | | | | |
|---|---|---|---|---|
| 7,770,880 B2* | 8/2010 | Yamazaki | | B65H 3/44 271/9.01 |
| 2001/0007458 A1* | 7/2001 | Purcell | | B41J 2/01 347/19 |
| 2004/0061280 A1* | 4/2004 | Sciurba | | B65H 1/18 271/152 |
| 2007/0047979 A1* | 3/2007 | Ai | | G03G 15/6508 399/23 |
| 2007/0236725 A1* | 10/2007 | Harmon | | G06F 3/1204 358/1.15 |
| 2009/0166949 A1* | 7/2009 | Unno | | B41J 11/485 271/9.03 |
| 2009/0284784 A1* | 11/2009 | Morita | | H04N 1/00233 358/1.15 |
| 2010/0225047 A1* | 9/2010 | Yoshimura | | B65H 3/44 271/9.07 |
| 2012/0001377 A1* | 1/2012 | Miyahara | | B65H 3/44 271/9.06 |
| 2014/0078549 A1* | 3/2014 | Amiya | | H04N 1/00233 358/1.15 |
| 2015/0043931 A1* | 2/2015 | Unno | | G03G 15/6508 399/45 |
| 2015/0243007 A1* | 8/2015 | Bless | | B41F 33/0036 382/112 |
| 2015/0249752 A1* | 9/2015 | Imai | | H04N 1/00042 358/1.15 |
| 2016/0028909 A1* | 1/2016 | Higashiura | | G03G 15/655 358/1.12 |
| 2017/0346956 A1* | 11/2017 | Nakamura | | G06F 3/1236 |

FOREIGN PATENT DOCUMENTS

| | | |
|---|---|---|
| JP | 2006298652 A | 11/2006 |
| JP | 2007065323 A | 3/2007 |

* cited by examiner

FIG. 6

| TRAY NO. | SHEET SIZE | PAPER TYPE | PAPER WEIGHT | PRODUCT NAME (MANUFACTURER) | SHEETS IN TRAY |
|---|---|---|---|---|---|
| 1 | A4 | COLOR | 105g/m2 | HiColor (Manufacturer A) | 250 |
| 2 | A4 | COLOR | 108g/m2 | Color+ (Manufacturer B) | 750 |
| 3 | A4 | COATED | 128g/m2 | HiCote (Manufacturer A) | 500 |
| 4 | B4 | COATED | 128g/m2 | HiCote (Manufacturer A) | 550 |
| 5 | SRA3 | COLOR | 105g/m2 | Color+ (Manufacturer B) | 300 |
| 6 | SRA3 | COATED | 128g/m2 | HiCote (Manufacturer A) | 250 |

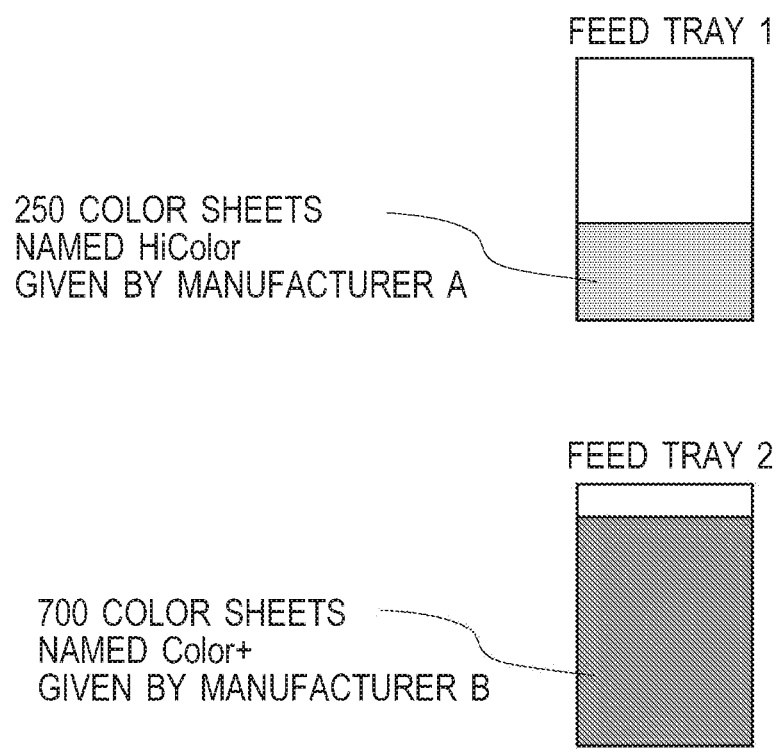

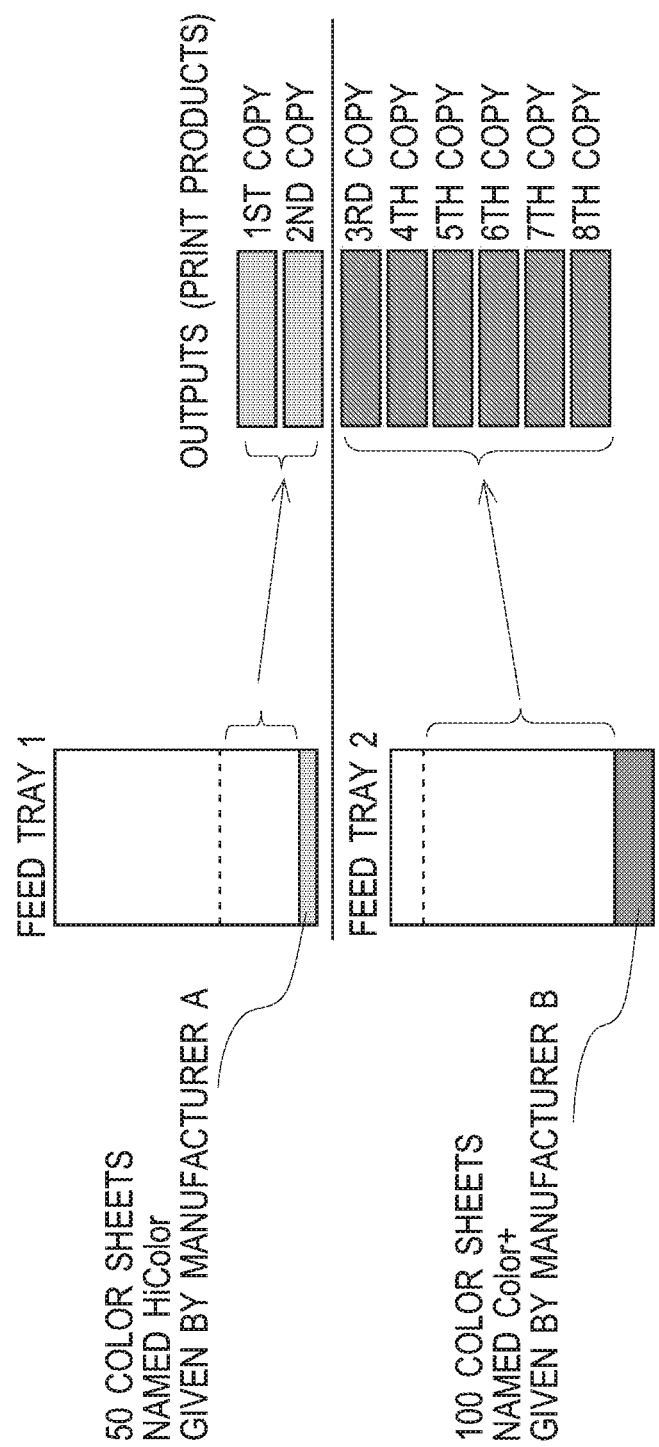

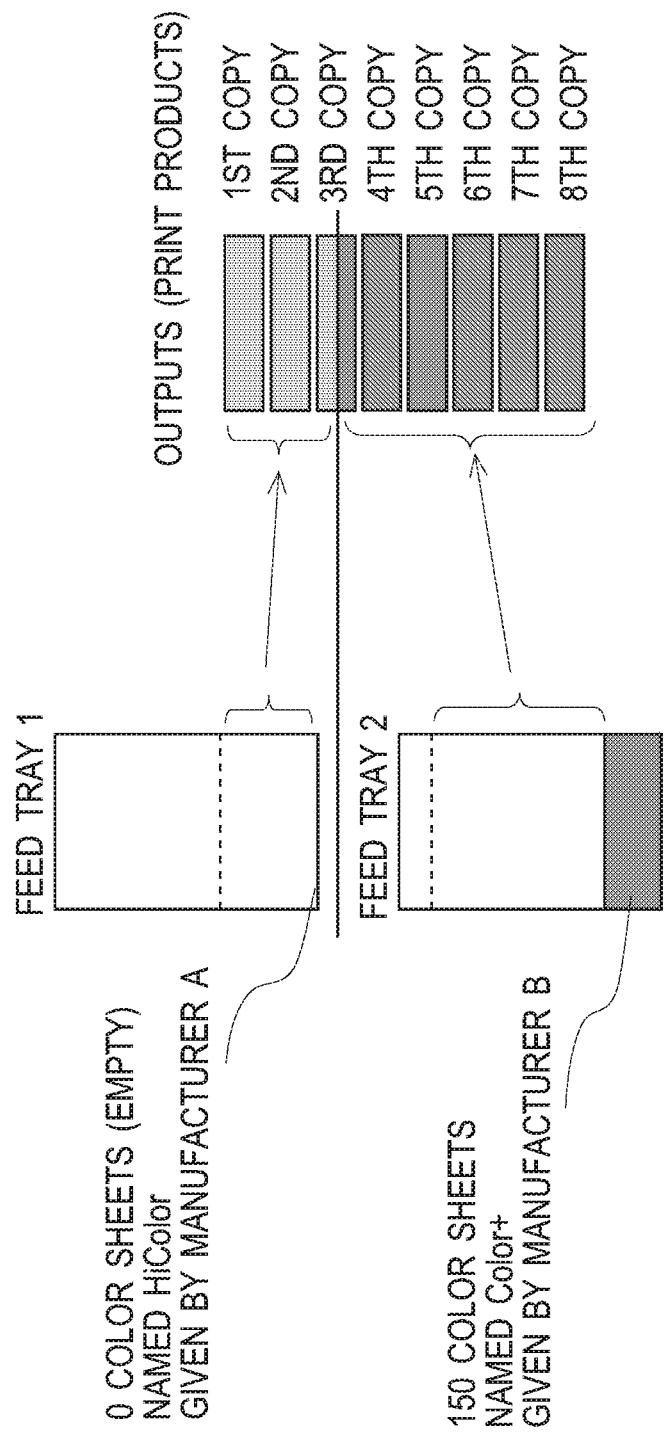

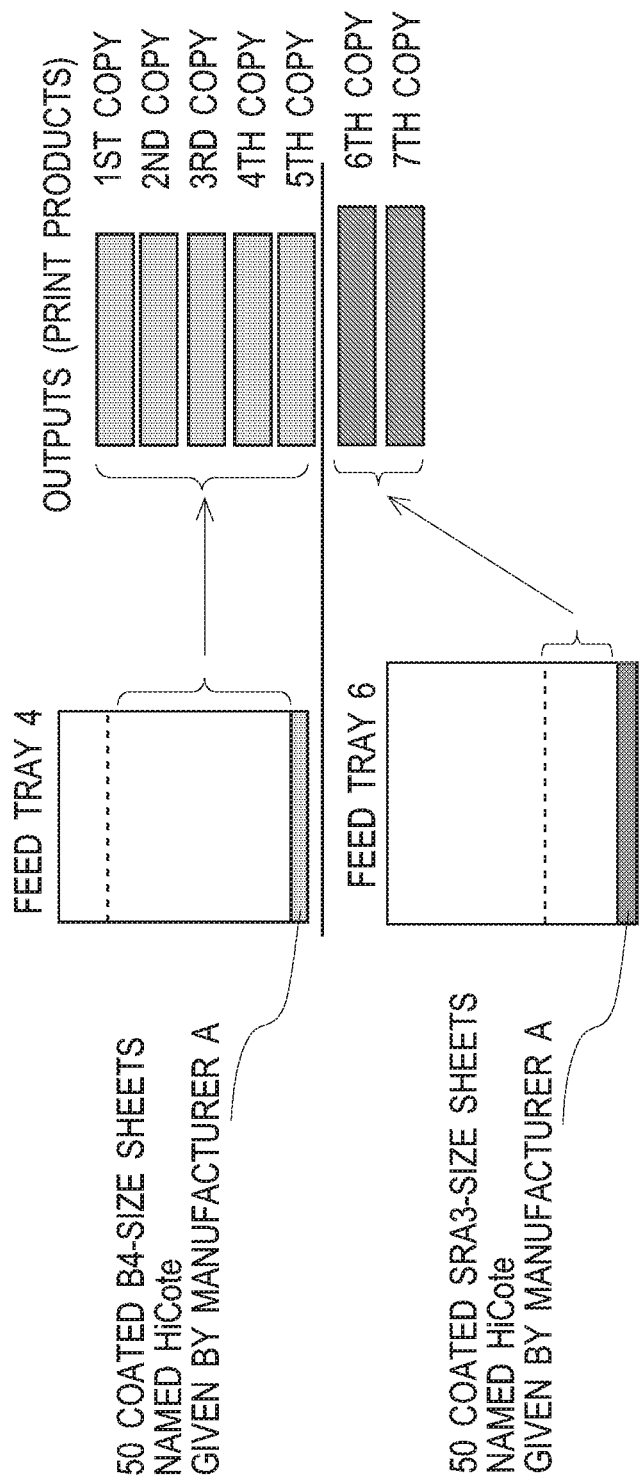

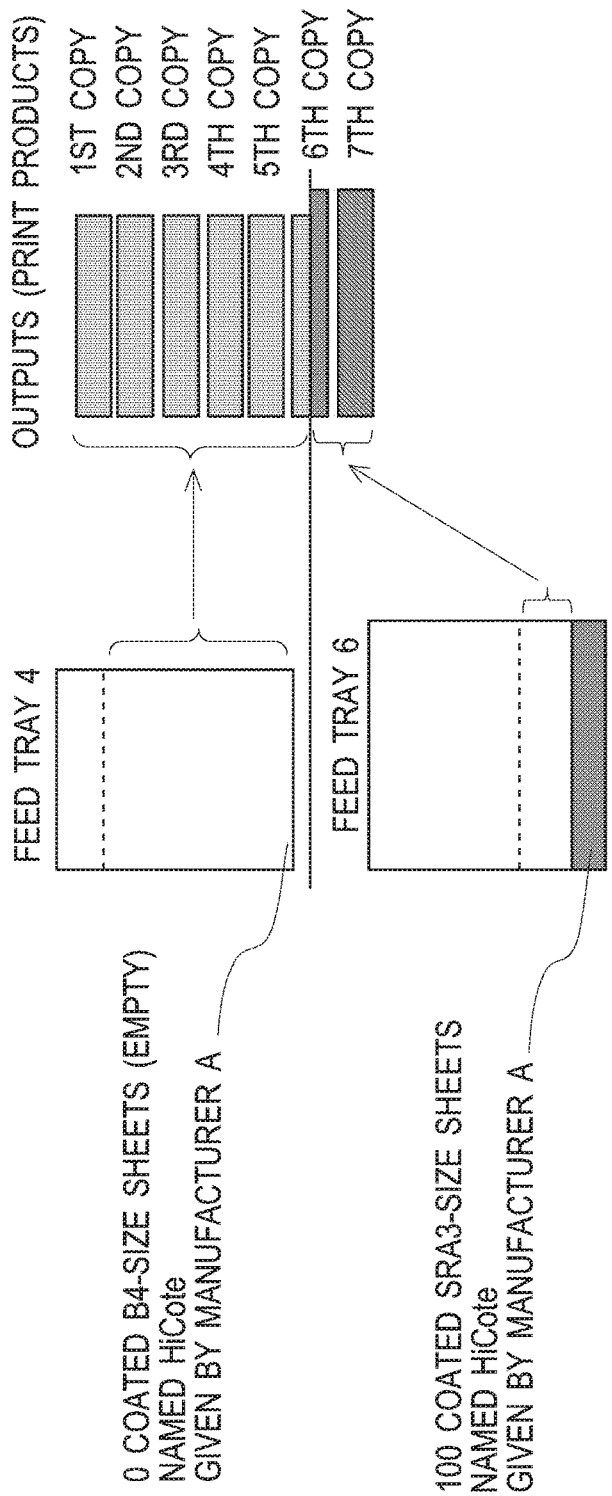

IMAGE FORMING APPARATUS AND NON-TRANSITORY RECORDING MEDIUM STORING PRINT CONTROL PROGRAM

Japanese Patent Application No. 2017-052301 filed on Mar. 17, 2017, including description, claims, drawings, and abstract, the entire disclosure of which is incorporated herein by reference in its entirety.

TECHNOLOGICAL FIELD

The present invention is directed to image forming apparatuses and non-transitory recording media each storing a print control program. In particular, the present invention is directed to image forming apparatuses equipped with multiple feed trays separately containing different kinds of sheets, and non-transitory recording media each storing a computer-readable program for print control using the multiple feed trays, for use in in the image forming apparatus.

BACKGROUND

Most image forming apparatuses, such as MFPs (Multi-Functional Peripherals), are equipped with multiple feed trays containing print sheets, and are configured to automatically change a feed tray to be used for printing, according to the amount of sheets loaded in each of the multiple feed trays, so as to prevent the processing of a print job from being interrupted because of an empty feed tray.

As one example of a technique to obtain the amount of sheets in a feed tray, Japanese Unexamined Patent Publication (JP-A) No. 2000-281243 discloses an image forming apparatus including a sheet tray that stores sheets for printing. The image forming apparatus is configured to feed sheets one by one from the sheet tray into a sheet conveyance path and form an image on each sheet conveyed to an image thrilling position in the sheet conveyance path. The image forming apparatus further includes a supplied-sheet counter that counts the number of sheets supplied into the sheet tray, a fed-sheet counter that counts the number of sheets fed into the sheet conveyance path from the sheet tray, and a remaining-sheet amount calculator that calculates the amount of remaining sheets in the sheet tray on the basis of a count result given by the supplied-Sheet counter and a count result given by the fed-sheet counter.

As one example of control of an image forming apparatus according to the amount of sheets in a feed tray, JP-A No. H09-081344 discloses a printing system that includes a printer and a host computer that sends print data to the printer to make the printer to execute printing. The printer includes a remaining-sheet sensor that senses the amount of remaining print sheets in a feed tray. The host computer includes a necessary-sheet amount calculator that calculates the amount of print sheets necessary for one printing process; and a determiner that determines whether there are enough print sheets by comparing the amount of necessary print sheets calculated by the necessary-sheet amount calculator and the amount of remaining print sheets given by the remaining-sheet sensor. The host computer further includes a notifier that notifies the shortage of print sheets when the determiner has determined there are not enough print sheets, and a control processor that, in response to receiving a notification of the shortage of print sheets from the notifier, controls the host computer so as to make the printer execute printing on condition that print sheets has been supplied into the feed tray.

As another example of the control, JP-A No. 2006-298652 discloses a sheet-feed control device for an image forming apparatus equipped with multiple feed trays. The sheet-feed control device includes a memory that memorizes the quality of sheets stored in each of the multiple feed trays; an alternative decider that, on finding a feed tray, which is a current sheet feeder among the multiple feed trays, in a state incapable of feeding sheets, decides a certain feed tray as an alternative sheet feeder, where the certain feed tray stores sheets the quality of which is different form the quality of sheets in the current sheet feeder and is specified in advance as an alternative to the quality of sheets in the current sheet feeder; and a changer that changes the sheet feeder to another feed tray on the basis of the decision of the alternative decider.

As another example of the control, JP-A No. 2007-065323 discloses an image forming apparatus including multiple sheet-storage units each storing sheets; a sheet feeder disposed in each of the multiple sheet-storage units so as to feed sheets out from the sheet-storage unit; and a control processor that changes the mode of changing sheet-feed operations, from those using a certain sheet-storage unit to those using another sheet-storage unit automatically, between the first mode to change a sheet-storage unit to be used for the sheet-feed operations, from the sheet-storage unit currently being used to another sheet-storage unit, with a certain amount of sheets left in the sheet-storage unit currently being used, and the second mode to change a sheet-storage unit to be used for the sheet-feed operations, from the sheet-storage unit currently being used to another sheet-storage unit after all the sheets in the sheet-storage unit currently being used have been fed out.

In commercial printing, in order to stock a large volume of print sheets stably, printers or publishers implement redundancy of sheet suppliers, by getting print sheets from multiple sheet suppliers. Such print sheets can have some differences in terms of texture and paper color depending on the manufacturer, even if the print sheets are manufactured according to similar specifications, and need to be handled with being loaded in separate feed trays according to the differences.

However, the conventional techniques of automatically changing a feed tray, select a feed tray to be used for printing, on the basis of just the amount of sheets in each feed tray. Therefore, when the currently-used feed tray becomes empty (or the amount of sheets in the currently-used feed tray becomes equal to or less than a predetermined amount), the conventional techniques automatically change a feed tray being used for printing to another feed tray even in the middle of printing one print product irrespective of the processing state of a print job. In an image forming apparatus equipped with multiple feed trays for sheets of the same size, in which sheets of different kinds are loaded, the conventional techniques can cause a problem such that the image forming apparatus can create print products having less commercial value to be used for commercial printing, for example, a document including two facing pages printed on sheets different in texture and/or paper color.

SUMMARY

The present invention is directed to image forming apparatuses including multiple feed trays and non-transitory recording media each storing a computer-readable print control program, which allow implementation of redundancy of print sheet suppliers (in other words, creation of print products by using sheets got form multiple sheet suppliers), without sacrificing the commercial value of print products created.

An image forming apparatus reflecting one aspect of the present invention is an image forming apparatus comprising: a plurality of feed trays; a print engine that prints according to a print job on sheets fed from one of the plurality of feed trays; and one or more hardware processors that perform the following operations. The operations include analyzing a print job to determine print products to be printed. The operations further include monitoring the amount of sheets in each of the plurality of feed trays, to determine, for each of the print products, whether the amount of sheets contained at the beginning of printing the each of the print products in a feed tray being used for printing among the plurality of feed trays, is not less than the necessary amount of sheets for printing the each of the print products. The operations further include causing the print engine to print each of the print products. The causing the print engine to print each of the print products includes, on determining that the amount of sheets in the feed tray being used for printing, determined for a next print product, which is a print product to be printed next to a print product currently being printed, is less than the necessary amount of sheets for printing the next print product, causing the print engine to suspend printing the next print product.

An image forming apparatus reflecting one aspect of the present invention is an image forming apparatus which can change a feed tray being used for printing to another feed tray during the printing. The image forming apparatus comprises: a plurality of feed trays; a print engine that prints according to a print job on sheets fed from one of the plurality of feed trays; and one or more hardware processors that perform the following operations. The operations include analyzing a print job to determine print products to be printed. The operations further include, on finding two or more feed trays separately containing different kinds of sheets that meet conditions for sheets specified in the print job, among the plurality of feed trays, monitoring the amount of sheets in each of the plurality of feed trays, to determine, for each of the print products, whether the amount of sheets contained at the beginning of printing the each of the print products in one or more feed trays, which contain sheets of same kind as sheets being used for printing, among the plurality of feed trays, is not less than the necessary amount of sheets for printing the each of the print products. The operations further include causing the print engine to print each of the print products. The causing the print engine to print each of the print products includes, on determining that the amount of sheets in the one or more feed trays, determined for a next print product, which is a print product to be printed next to a print product currently being printed, is less than the necessary amount of sheets for printing the next print product, performing one of: causing the print engine to suspend printing the next print product, and changing the feed tray being used for the printing to another feed tray among the two or more feed trays, where the another feed tray contains sheets the amount of which is not less than the necessary amount of sheets for printing the next print product.

A non-transitory recording medium reflecting one aspect of the present invention stores a computer-readable program for print control, to be executed in an image forming apparatus. The image forming apparatus comprises a plurality of feed trays, a print engine that prints according to a print job on sheets fed from one of the plurality of feed trays, and one or more hardware processors. The program comprises instructions which, when executed by the one or more hardware processors, cause the image forming apparatus to perform the following operations. The operations comprise analyzing a print job to determine print products to be printed. The operations further comprise monitoring the amount of sheets in each of the plurality of feed trays, to determine, for each of the print products, whether the amount of sheets contained at the beginning of printing the each of the print products in a feed tray being used for printing among the plurality of feed trays, is not less than the necessary amount of sheets for printing the each of the print products. The operations further comprise causing the print engine to print each of the print products. The causing the print engine to print each of the print products includes, on determining that the amount of sheets in the feed tray being used for printing, determined for a next print product, which is a print product to be printed next to a print product currently being printed, is less than the necessary amount of sheets for printing the next print product, causing the print engine to suspend printing the next print product.

A non-transitory recording medium reflecting one aspect of the present invention stores a computer-readable program for print control, to be executed in an image forming apparatus which can change a feed tray being used for printing to another feed tray during the printing. The image forming apparatus comprises a plurality of feed trays, a print engine that prints according to a print job on sheets fed from one of the plurality of feed trays, and one or more hardware processors. The program comprises instructions which, when executed by the one or more hardware processors, cause the image forming apparatus to perform the following operations. The operations comprise analyzing a print job to determine print products to be printed. The operations further comprise, on finding two or more feed trays separately containing different kinds of sheets that meet conditions for sheets specified in the print job, among the plurality of feed trays, monitoring the amount of sheets in each of the plurality of feed trays, to determine, for each of the print products, whether the amount of sheets contained at the beginning of printing the each of the print products in one or more feed trays, which contain sheets of same kind as sheets being used for printing, among the plurality of feed trays, is not less than the necessary amount of sheets for printing the each of the print products. The operations further comprise causing the print engine to print each of the print products. The causing the print engine to print each of the print products includes, on determining that the amount of sheets in the one or more feed trays, determined for a next print product, which is a print product to be printed next to a print product currently being printed, is less than the necessary amount of sheets for printing the next print product, performing one of: causing the print engine to suspend printing the next print product, and changing the feed tray being used for the printing to another feed tray among the two or more feed trays, where the another feed tray contains sheets the amount of which is not less than the necessary amount of sheets for printing the next print product.

BRIEF DESCRIPTION OF THE DRAWINGS

The advantages and features provided by one or more embodiments of the invention will become more hilly understood from the detailed description given hereinbelow and the appended drawings which are given by way of illustration only, and thus are not intended as a definition of the limits of the present invention, wherein:

FIG. 6 is a diagram illustrating an example of feed-tray information used for print control of the image forming apparatus according to one embodiment of the present invention;

FIGS. 7A, 7B, and 7C are schematic diagrams for illustrating print control of the image forming apparatus according to one embodiment of the present invention; and FIGS. 8A, 8B, and 8C are schematic diagrams for illustrating print control of the image forming apparatus (for printing that needs or includes post processing) according to one embodiment of the present invention.

DETAILED DESCRIPTION OF EMBODIMENTS

Figure 1:
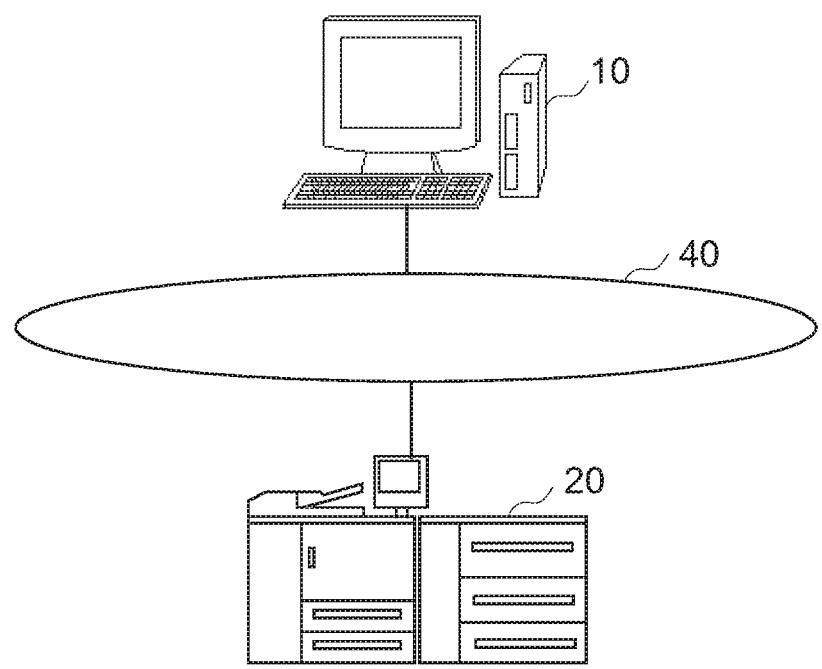
FIG. 1 is a schematic diagram illustrating a constitution example of a printing system according to one embodiment of the present invention.

Hereinafter, one or more embodiments of the present invention will be described with reference to the drawings. However, the scope of the invention is not limited to the illustrated embodiments.

As described in the BACKGROUND, in commercial printing, printers or publishers implement redundancy of print sheet suppliers by purchasing print sheets from multiple sheet suppliers. Such print sheets can have some differences in terms of texture and paper color depending on the manufacturer, even if the print sheets are manufactured according to similar specifications. When an image forming apparatus, which is equipped with multiple feed trays separately containing various kinds of sheets having some differences in terms of texture and paper color, executes printing while employing conventional feed-tray changing operations according to just the amount of sheets in each feed tray, it can result in a problem such that print products created with the image forming apparatus have less commercial value, for example, a print product includes two facing pages printed on sheets different in texture and/or paper color.

In view of that, as one embodiment of the present invention, there is provided an image forming apparatus which includes multiple feed trays, and is configured to monitor the amount of sheets in each of the multiple feed trays. The image forming apparatus is configured to perform the following print control when receiving and processing a print job. That is, one or more of hardware processors of the image forming apparatus analyze a print job to determine print products to be printed, so as to execute print control (to determine whether to suspend printing a print product to be printed next to a print product currently being printed) according to the amounts of sheets in feed trays, each time to print a print product. For a print job including instructions to print a certain number of copies of a print product, the one or more of hardware processors determine a certain number of copies of the print product as the print products to be printed; and for a print job including instructions to perform variable data printing by using variable data records, the one or more of hardware processors determine the print products merged with the respective variable data records as the print products to be printed. In printing the print products by a print engine of the image forming apparatus, the one or more hardware processors use a result of the determination whether the amount of sheets in the currently-used feed tray at the beginning of a next print product, which is to be printed next to a print product currently being printed, is less than the necessary amount of sheets for printing the next print product, and cause the print engine to suspend the printing, before printing a print product that will make the currently-used feed tray empty. That is, the one or more of hardware processors monitor the amount of sheets in each of the multiple feed trays, to determine, for each print product, whether the amount of sheets contained at the beginning of printing the each print product in the currently-used feed tray is not less than the necessary amount of sheets for printing the each print product. During causing the print engine to print each of the print products, when determining that the amount of sheets in the currently-used feed tray, determined for the next print product is less than the necessary amount of sheets for printing the next print product, the one or more of hardware processors cause the print engine to suspend printing the next print product. When causing the print engine to suspend printing the next print product, the one or more of hardware processors may cause a display unit of the image forming apparatus to display a message which prompts an operator to supply sheets to the feed tray bang used for the printing or prompts an operator to change the feed tray being used for the printing to another of the plurality of feed trays, so as to inform the operator about the message.

As another embodiment of the present invention, there is provided an image forming apparatus which includes multiple feed trays, and is configured to change a feed tray being used for printing to another feed tray during the printing. The image forming apparatus is configured to perform the following print control when receiving and processing a print job. That is, one or more of hardware processors of the image forming apparatus analyze a print job to determine print products to be printed, similarly to the above, so as to execute print control (to determine whether to suspend printing a print product to be printed next to a print product currently being printed or to change a feed tray currently being used for printing) according to the amount of sheets in feed trays, each time to print a print product. In printing the print products by a print engine of the image forming apparatus, the one or more hardware processors use a result of the determination whether the amount of sheets contained in one or more feed trays, which contain sheets of the same kind as sheets being used for printing, at the beginning of a next print product, which is to be printed next to a print product currently being printed, is less than the necessary amount of sheets for printing the next print product, and cause the print engine to suspend the printing or change the currently-used feed tray to another feed tray, before printing a print product that will make the currently-used feed tray and other feed tray that contain the same kind of sheets empty. That is, when finding two or more feed trays separately containing different kinds of sheets that meet conditions for sheets specified in the print job, the one or more of hardware processors monitor the amount of sheets in each of the multiple feed trays, to determine, for each print product, whether the amount of sheets contained at the beginning of printing the each print product in one or more feed trays, which contain sheets of same kind as sheets used for printing, is not less than the necessary amount of sheets for printing the each print product. During causing the print engine to print each of the print products, when determining that the amount of sheets in the one or more feed trays, determined for the next print product, is less than the necessary amount of sheets for printing the next print product, the one or more of hardware processors cause the print engine to suspend printing the next print product, or change the currently-used feed tray being used for the printing to another feed tray among the two or more feed trays, where the another feed tray contains sheets the amount of which is not less than the necessary amount of sheets for printing the next print product. When causing the print engine to suspend printing the next print product, the one or more of hardware processors may cause a display unit of the image forming apparatus to display a message which prompts an operator to supply sheets to the feed tray being used for the printing or prompts an operator to change the feed tray being used for the printing to another of the plurality of feed trays, so as to inform the operator about the message. When changing the currently-used feed tray to another feed tray, the one or more of hardware processors may perform one of: recording a message that the feed tray being used for the printing has been changed, in a storage unit; and causing the display unit to display a message that the feed tray being used for the printing has been changed, so as to inform the operator about the message. When determining that the amount of sheets in the one or more feed trays, determined for the next print product, is less than the necessary amount of sheets for printing the next print product, the one or more of hardware processors may determine whether a change of kind of sheets for printing at least one of the print products, is acceptable. When determining that the change is not acceptable, the one or more of hardware processors may cause the print engine to suspend printing the next print product; and when determining that the change is acceptable, the one or more of hardware processors may change the feed tray being used for the printing to another feed tray, to resume printing the next print product.

The above-described control operations allow a supply of sheets into a feed tray or a change of a feed tray being used for printing to another feed tray, at the start or end of printing each of print products (a certain number of copies of a print product or print products merged with respective variable print records, which are specified in a print job). Thereby, the image forming apparatus can create print products without using different kinds of sheets in a mixed manner in printing each print product. It avoids, especially in commercial printing, deterioration of the commercial value of the created print products, before it arises.

The above-described operations can provide print products such that one or more print products are different from the other print products in kind of print sheets. For example, one or more of the copies of a print product (one or more of print products merged with respective variable print records) can be printed by using sheets being different in kind from those for the other copies (the other print products). It would not cause a significant problem in printing a certain kind of print products to be separately delivered or distributed to a great number of people, such as direct mails, leaflets and brochures, because each recipient focuses on the quality of just a delivered (distributed) print product and does not mind a difference of the quality from other print products.

Examples

Figure 2A:
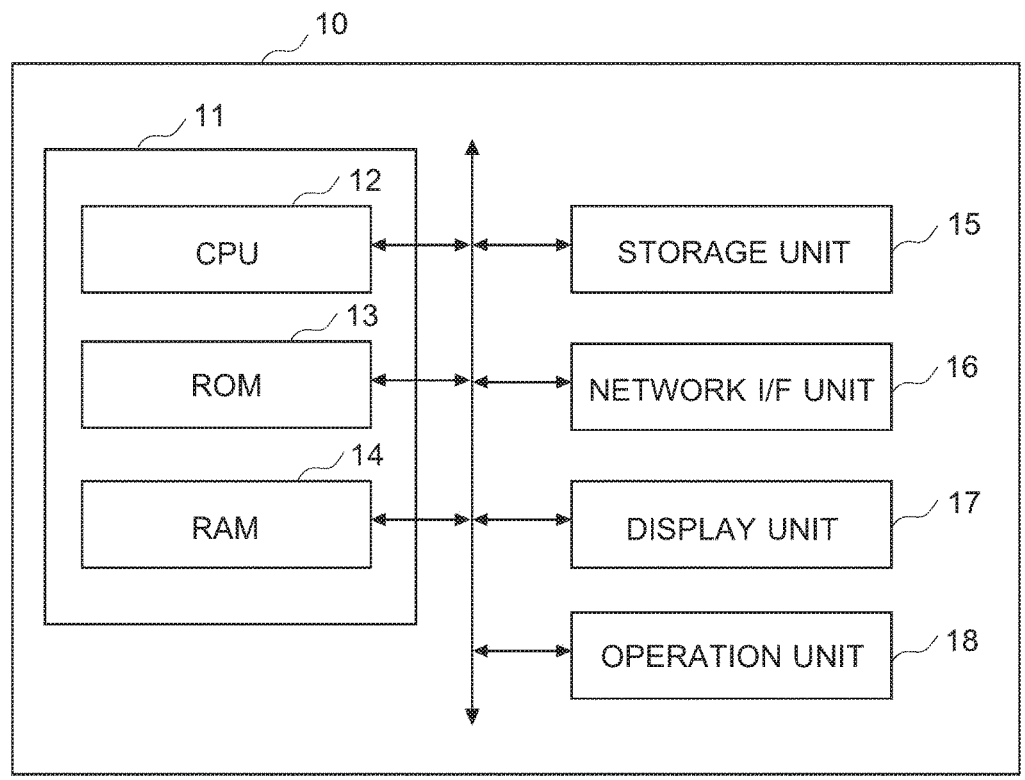
FIGS. 2A and 2B are block diagrams illustrating a constitution example of a client terminal according to one embodiment of the present invention.
Figure 2B:
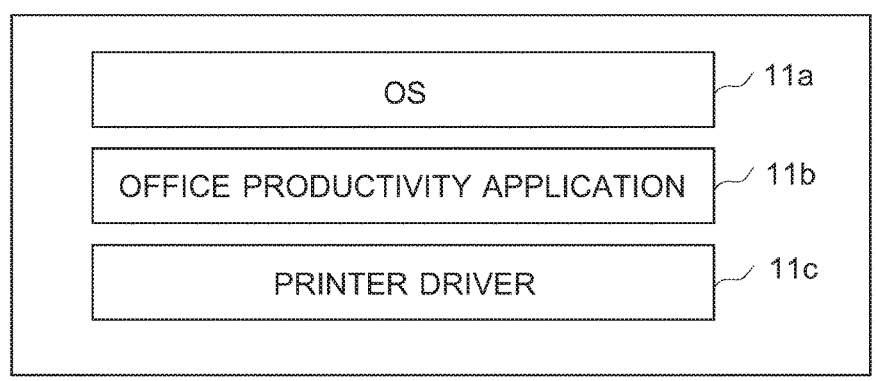
Figure 3:
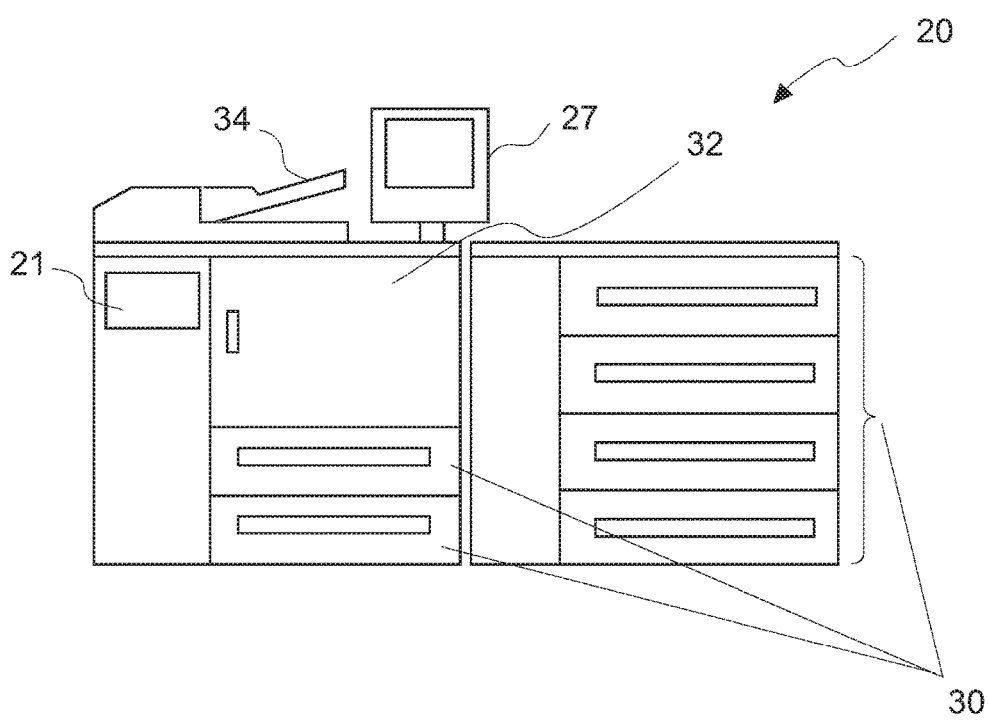
FIG. 3 is a schematic diagram illustrating a constitution example of an image forming apparatus according to one embodiment of the present invention.
Figure 4A:
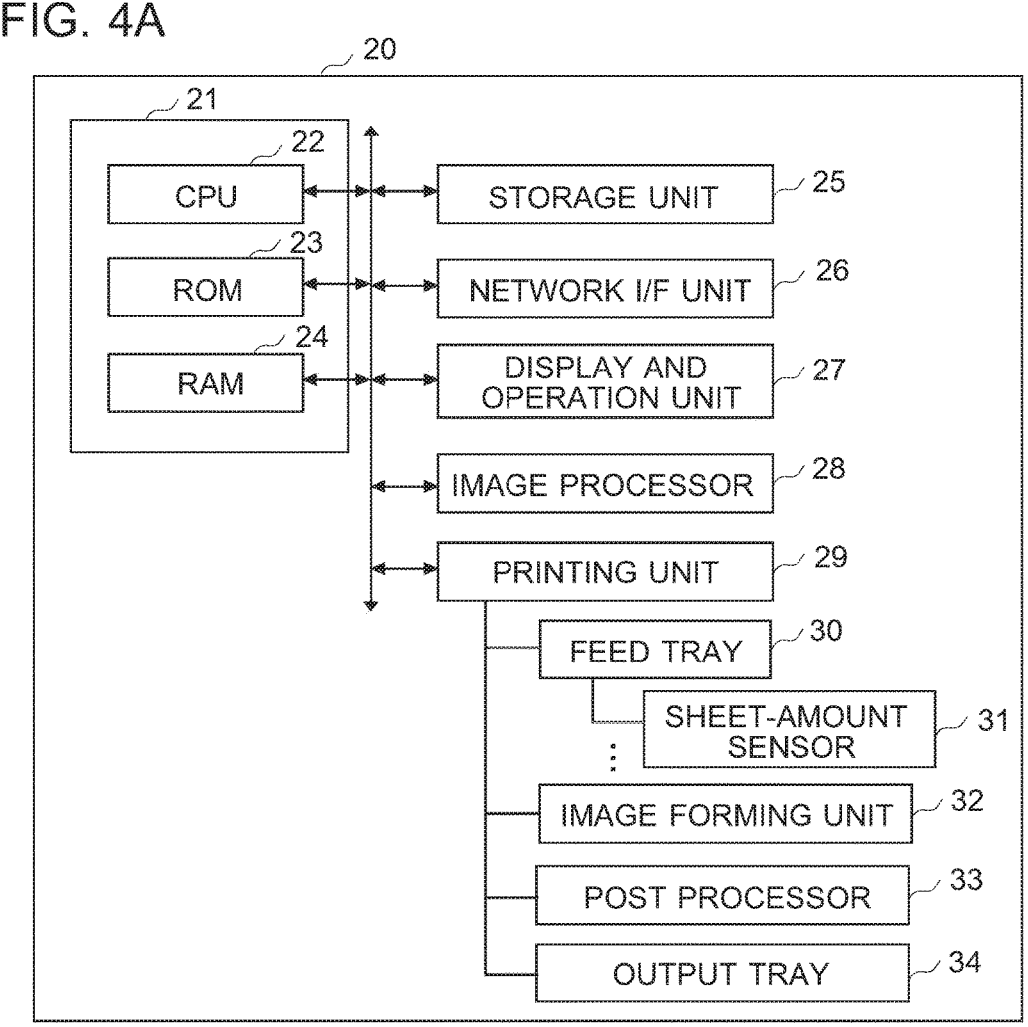
FIGS. 4A and 4B are block diagrams illustrating a constitution example of an image forming apparatus according to one embodiment of the present invention.
Figure 4B:
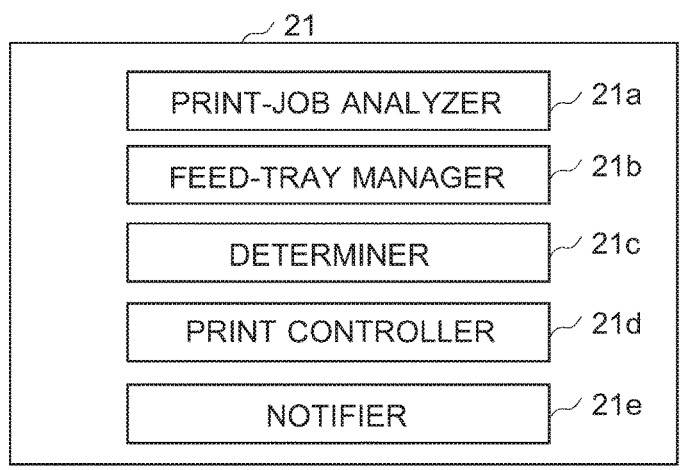
Figure 5:
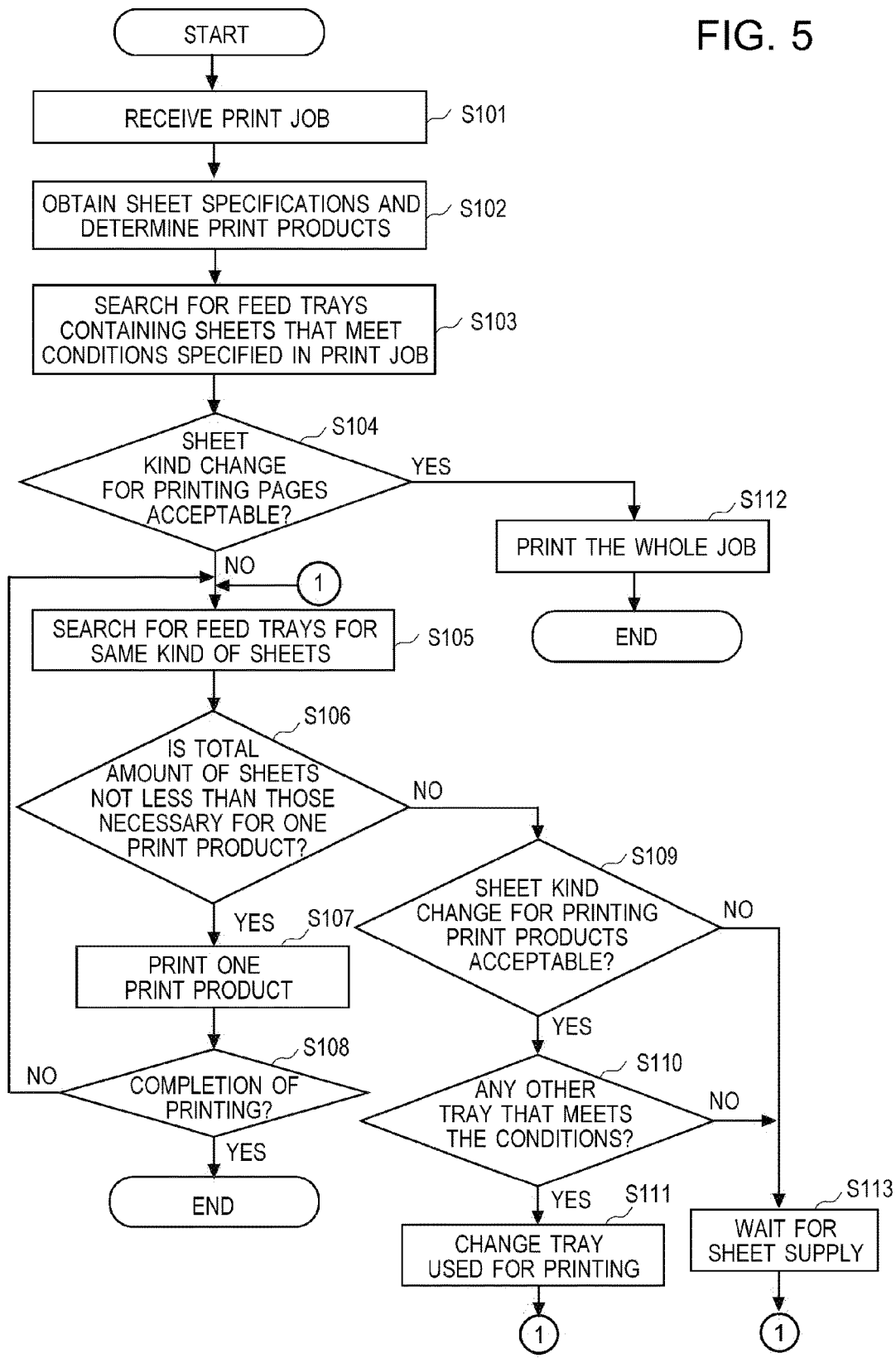
FIG. 5 is a flowchart illustrating an example of operations of an image forming apparatus according to one embodiment of the present invention.

In order to describe an embodiment of the present invention in more in detail, a description is given to one example of an image forming apparatus, a non-transitory medium storing a print control program and a print control method, with reference to FIG. 1 through FIG. 8C. FIG. 1 is a schematic diagram illustrating a constitution example of a printing system of the present example. FIGS. 2A and 2B are block diagrams illustrating a constitution example of a client terminal of the present example. FIG. 3 is a schematic diagram illustrating a constitution example of an image forming apparatus of the present example. FIGS. 4A and 4B are a block diagrams illustrating a constitution example of an image forming apparatus of the present example. FIG. 5 is a flowchart illustrating an example of operations of an image forming apparatus of the present example. FIG. 6 is a schematic diagram illustrating an example of feed-tray information used in print control of the present example. FIGS. 7A, 7B, and 7C and FIGS. 8A, 8B, and 8C are schematic diagrams for illustrating print control of the present example.

As illustrated in FIG. 1, a printing system of the present example includes at least one client terminal 10 for creating and sending a print job, and at least one image forming apparatus 20 for executing printing according to a print job. These apparatuses are communicatively connected to each other via a communication network 40, where examples of the communication network 40 include a LAN (Local Area Network) and a WAN (Wide Area Network), conforming to a standard, for example, Ethernet, Token Ring, or FDDI (Fiber-Distributed Data Interface) and the like.

Client Terminal:

Client terminals 10 is a computing device like a personal computer, and is configured to send a print job to image forming apparatus 20. The client terminal 10 includes, as illustrated in FIG. 2A, control unit 11, storage unit 15, network interface (I/F) unit 16, display unit 17 and operation unit 18.

Control unit 11 includes CPU (Central Processing Unit) 12 and memories, such as ROM (Read Only Memory) 13 and RAM (Random Access Memory) 14. CPU 12 is a micro-processor and is configured to read control programs stored in ROM 13 or storage unit 15 to load the control programs onto RAM 14, and then execute the control programs, thereby controlling the overall operations of client terminal 10. The control unit 11 (CPU 12) is further configured to execute, as illustrated in FIG. 2B, OS (Operating System) 11*a*, office productivity application 11*b* and printer driver 11*c* and other programs.

Examples of OS 11*a* include Windows, macOS and Android, where Windows is a trademark of Microsoft Corporation registered in the United States and/or other countries, macOS is a trademark of Apple Inc. registered in the U.S. and other countries, and Android is a trademark of Google Inc. in the United States and/or other countries. OS 11*a* manages office productivity application 11*b* and printer driver lie in the client terminal 10 so as to function and run the programs.

Examples of office productivity application 11*b* include word processing, spreadsheet, and image processing software programs. When instructing to print original data created by the productivity application 11*b*, office productivity application 11*b* invokes printer driver 11*c* and transfers the data created by office productivity application 11*b* to the printer driver 11*e*.

Printer driver 11*c* converts data created by office productivity application 11*b*, into a print job written in a language that image forming apparatus 20 can interpret, where examples of a print job include PDL (Page Description Language) data written in page description languages, such as PJL (Printer Job Language), PS (PostScript) and PCL (Printer Control Language); and PDF (Portable Document Format) data. Such a print job includes conditions for image formation (for example, the number of copies of a print product to be printed, and specifications of sheets to be used for printing) and conditions for post processing (for example, specifications about post processing or finishing), which were specified on a print setup screen of printer driver 11c, and optionally includes instruction parameters relating to printing services. Examples of the instruction parameters include the purpose of use of print products to be printed (for example, personal purpose, office purpose, promotional purpose or commercial purpose), the way to deliver print products to be printed (for example, delivering the whole print products at one time, delivering the print products in installments, delivering the print products individually to recipients, or distributing the print products to a large number of people), the deadline for delivering print products to be printed, and the degree of urgency of the need for print products to be printed.

Storage unit 15 includes a memory, such as a HDD (Hard Disk Drive), a SSD (Solid State Drive) or the like, storing programs which, when being executed, cause CPU 12 to control the components of client terminal 10, information about processing and functions of client terminal 10, data created by office productivity application 11b, print jobs created by printer driver 11c and other data.

Network I/F unit 16 includes a NIC (Network Interface Card) and/or a modem. The network I/F unit 16 communicatively connects client terminal 10 to communication network 40 so as to send a print job to image forming apparatus 20.

Display unit 17 includes a display like a LCD (Liquid Crystal Display) or an OEL (organic electroluminescence) display, and is configured to display various types of screen including an original creation screen of office productivity application 11b and a print setup screen of printer driver 11c, and others.

Operation unit 18 includes input hardware devices, such as a mouse and a keyboard, and is configured to allow an operator to perform operations to create an original by using office productivity application 11b and further allow an operator to setup conditions for image formation and conditions for post processing by using printer driver 11c.

For the purpose of creating print data which allow image forming apparatus 20 to execute direct printing, like PDF (Portable Document Format), XPS (XML paper specification), OOXML (Office Open XML) and ODF (OpenDocument Format) files, by using office productivity application 11b, client terminal 10 may include a utility program for direct printing in place of printer driver 11e. In direct printing, the utility program for direct printing monitors a predetermined folder (for example, a folder created in storage unit 15), and when finding print data created by office productivity application 11b, stored into the predetermined folder, the utility program sends the print data to image forming apparatus 20 to instruct the image forming apparatus 20 to execute direct printing.

Image Forming Apparatus:

Image forming apparatus 20 is a printing device like a MIT or a single-function printer, and is configured to execute printing according to a print job received from client terminal 10. Image forming apparatus 20 includes, as illustrated by FIG. 3 and FIG. 4A, control unit 21, storage unit 25, network interface (IN) unit 26, display and operation unit 27, image processor 28 and printing unit 29.

Control unit 21 includes CPU 22 and memories, such as ROM 23 and RAM 24. CPU 22 includes a micro-processor, and is configured to read control programs stored in ROM 23 or storage unit 25 to load the control programs onto RAM 24, and then execute the control programs, thereby controlling the overall operations of image forming apparatus 20. The control unit 21 (CPU 22) is further configured to work, as illustrated in FIG. 4B, as print-job analyzer 21a, feed-tray manager 21b, determiner 21c, print controller 21d and notifier 21e.

Print-job analyzer 21a is configured to analyze a print job to obtain conditions for image formation and conditions for post processing, and if needed, obtain instruction parameters about printing services. Print-job analyzer 21a is further configured to analyze the print job to determine print products to be printed (for example, a certain number of copies of a print product to be printed or print products merged with respective variable data records for variable data printing).

Feed-tray manager 21b is configured to create an information set (hereafter, referred to as feed-tray information) that associates each of feed trays of image forming apparatus 20 with information items about sheets loaded in the corresponding one of the feed trays, and records the feed-tray information into storage unit 25 to manage the feed-tray information. This feed-tray information includes various information items about sheets in each feed tray as illustrated in FIG. 6, such as the size, the paper type and others of sheets in each feed tray. The feed-tray information may further include detailed information items, such as the paper weight, the product name, the product number, the degree of whiteness and others of sheets in each feed tray. Feed-tray manager 21b may obtain these information items by causing an operator to setup the information items through operation and display unit 27, or by using a sheet sensor installed in each feed tray so as to automatically detect or measure the information items. Feed-tray manager 21b is further configured to monitor the amount of sheets contained in each feed tray by using signals given from a sheet-amount sensor installed in each feed tray, and updates the value of the amount of sheets in each feed tray in the feed-tray information.

Determiner 21c is configured to perform the following operations. That is, determiner 21c obtains an analysis result of the print job from print-job analyzer 21a and further obtains the feed-tray information from the feed-tray manager 21b. Determiner 21c then makes various determinations on the basis of the obtained analysis result and feed-tray information. For example, determiner 21c searches for a feed tray (referred to as a priority tray) containing sheets that meet the conditions specified in the print job (sheets specified by the sheet specifications in the print job). Determiner 21c further determines whether a change of kind of sheets for printing at least one of pages of the print products, is acceptable. This determination may be made from, for example, operator's instructions input directly into the image forming apparatus 20 through display and operation unit 27, or instruction parameters about printing services contained in a print job, such as the purpose of use of print products, the degree of urgency of the need for the print products and others. When determining that the change of kind of sheets for printing at least one of pages of the print products, is not acceptable, determiner 21c further determines, for each of the print products to be printed, whether the amount of sheets contained at the beginning of printing the each print products in a feed tray being used for printing (if there is one or more feed trays which contain sheets of the same kind as the sheets being used for printing, other than the feed tray being used for printing, the total sum of the sheets in the one or more feed trays and the feed tray being used for printing), is not less than the amount of sheets necessary for printing the each print product (hereinafter, referred to as the necessary amount of sheets). When determining that the amount of sheets in the feed tray being used for printing (or the total sum of sheets in the feed trays containing the same kind of sheets) is less than the necessary amount of sheets for one print product to be printed, determiner 21c further determines whether a change of kind of sheets for printing at least one of the print products, is acceptable. This determination may be made from, for example, operator's instructions input directly into the image forming apparatus 20 through display and operation unit 27, or instruction parameters about printing services contained in a print job, such as the purpose of use of the print products, the way to deliver the print products, the deadline for delivery of the print products, the degree of urgency of the need for the print products and others. When determining that a change of the kind of sheets for printing at least one of the print products, is acceptable, determiner 21c searches for another feed tray containing sheets that meet the conditions for sheets specified in the print job, where the amount of sheets contained in the feed tray is not less than the necessary amount of sheets for printing a print product to be printed, and the kind of the sheets contained in the feed tray may be differed from the kind of sheets specified in the print job.

Print controller 21d is configured to perform the following operations. That is, when determiner 21c determined that the amount of sheets contained, at the beginning of printing one print product to be printed next to the print product currently being printed (referred to as the next print product), in the feed tray being used for printing (or the total sum of the sheets in the feed trays containing the same kind of sheets) is not less than the amount of sheets necessary for printing the next print product, print controller 21d causes printing unit 29 to print the next print product. On the other hand, when determiner 21c determined that the amount of sheets contained, at the beginning of printing the next print product, in the feed tray being used for printing (or the total sum of the sheets in the feed trays containing the same kind of sheets) is less than the necessary amount of sheets for printing the next print product, print controller 21d causes printing unit 29 to suspend printing the next print product. In this determination, if determiner 21c determined that the amount of sheets contained in the feed tray or the feed trays is less than the necessary amount of sheets for printing the next print product, and further determined that a change of kind of sheets for printing at least one of the print products, is not acceptable, print controller 21d causes printing unit 29 to suspend printing a print product to be printed next to the print product currently being printed. If determiner 21c determined that the change of kind of sheets for printing at least one of the print products, is acceptable, but determiner 21c does not find any other feed tray containing sheets that meet the conditions specified in the print job, the amount of which is not less than the necessary amount of sheets for printing the next print product, print controller 21d causes printing unit 29 to suspend printing the next print product. If determiner 21c determined that that the change of kind of sheets for printing at least one of the print products, is acceptable, and determiner 21c found any other feed tray containing sheets that meet the conditions specified in the print job, the amount of which is not less than the necessary amount of sheets for printing the next print product, print controller 21d changes the feed tray being used for printing to the found feed tray, to cause printing unit 29 to start printing the next print product. Print controller 21d, as needed, records information (like a message) that the feed tray being used for printing has been changed, into storage unit 25 as history information of a use of feed trays.

Notifier 21e is configured to, when printing unit 29 has suspended printing the next print product, cause display and operation unit 27 to display a message that prompts an operator to supply sheets to the feed tray or change the feed tray being used for printing. Notifier 21e is further configured to, when the feed tray being used for printing has been changed, causes display and operation unit 27 to display a message that the feed tray being used for printing has been changed so as to inform an operator about the message.

The print-job analyzer 21a, feed-tray manager 21b, determiner 21c, print controller 21d and notifier 21e may be constituted as hardware devices. Alternatively, the print-job analyzer 21a, feed-tray manager 21b, determiner 21c, print controller 21d and notifier 21e (in particular, the print-job analyzer 21a, determiner 21c and print controller 21d) may be provided by a print control program which causes the control unit 21 to function as these components when being executed by CPU 22. That is, the control unit 21 may be configured to serve as the print-job analyzer 21a, feed-tray manager 21b, determiner 21c, print controller 21d and notifier 21e (in particular, the print job analyzer 21a, determiner 21c and print controller 21d), when CPU 22 executes the print control program.

Storage unit 25 includes a memory, such as a HDD, a SSD or the like, storing various kinds of program to be used by control unit 21 (CPU 22), data to be used for execution of the programs, a print job received from client terminal 10, image data created by image processor 28, feed-tray information and other data.

Network I/F unit 26 includes a NIC and/or a modem. The network I/F unit 26 communicatively connects image forming apparatus 20 to communication network 40 so as to receive a print job from client terminal 10.

Display and operation unit 27 is configured to display various screens including a screen for image forming and post processing according to instructions of control unit 21, and allows an operator to perform various operations relating to the image processing and post processing on the screens. Display and operation unit 27 is further configured to display various messages including the message that prompts an operator to supply sheets to the feed tray or change the feed tray being used for printing, and a message that the feed tray being used for printing has been changed. Examples of the display and operation unit 27 include a touch screen in which a pressure-sensitive operation unit (a touch sensor) composed of lattice-shaped transparent electrodes is arranged on a display unit like a LCD (Liquid Crystal Display) or an DEL (organic electroluminescence) display.

Image processor 28 includes a raster-image processor (RIP). Image processor 28 is configured to create intermediate data from a print job and rasterize pages in the print job to create bitmap image data. Image processor 28 is further configured to perform image processing (screening, tone correction, density-balance adjustment, thinning, halftoning and other processing) on the image data as needed, and then output the resulting image data to printing unit 29.

Printing unit (print engine) 29 includes multiple feed trays 30, image forming unit 32, post processor (finish and output tray 34, so as to execute printing on the basis of image data.

Feed trays 30 separately contain various kinds of print sheets, where the amount of sheets in each of feed trays 30 is monitored by control unit 21. Each feed tray 30 includes sheet-amount sensor 31 so as to measure the amount of sheets contained in the each feed tray 30. Sheet-amount sensors 31 in the feed trays 30 are not necessary components for image forming apparatus 20, and control unit 21 can estimate the amount of sheets in each feed tray 30 by the following operations, in place of obtaining the amounts of sheet in each feed tray 30 measured with the corresponding sheet-amount sensor 31. That is, when sheets has been supplied into one of feed trays 30, control unit 21 causes an operator to input the number of supplied sheets through display and operation unit 27, and subtracts the amount of sheets that have been used for printing, from the amount of supplied sheet, in printing processing, to estimate the amounts of sheets in the feed tray 30. The technique to obtain the amount of sheets in a feed tray is disclosed, for example, in JP-A No. 2000-281243.

Image forming unit 32 is configured to form an image on each sheet for printing by the following operations, and output sheets on which images have been formed. In image forming unit 32, an exposure unit irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a print sheet (second transfer processing), and are fixed onto the print sheet by a fixing unit.

Post processor (finisher) 33 is configured to receive sheets on which image forming unit 32 formed images, perform post processing specified by an operator, for example, punching, stapling, folding, binding or cutting the sheets, and then outputs the resulting sheets as finished print products.

Output tray 34 holds sheets on which image forming unit 32 formed images or sheets processed by the post processor 33.

It should be noted that FIGS. 1 to 4B illustrate the printing system of the present example for illustrative purpose only, and the constitution of each device in the printing system may be modified appropriately.

Hereinafter, a description is given of the operations of image forming apparatus 20 having the above-described constitution. CPU 22 reads out a print control program stored in ROM 23 or storage unit 25, loads the program onto RAM 24, and executes the program, thereby performing steps of the flowcharts illustrated in FIG. 5. The following description is given under the assumption that control unit 21 (feed-tray manager 21b) has already created feed-tray information illustrated in FIG. 6 and recorded the feed-tray information in to storage unit 25, in advance.

Control unit 21 of image forming apparatus 20 receives a print job through network IT unit 26, or obtains a print job according to operator's instructions given through display and operation unit 27 (Step S101). The print job includes image data for printing print products and specifications necessary for the printing, like the number of copies to be printed and information about sheets to be used for the printing. The print job may further include instruction parameters which relate to printing services and do not directly relate to the printing operations of the printing unit 29, where examples of the instruction parameters include the purpose of use of print products to be printed (for example, personal purpose, office purpose, promotional purpose or commercial purpose), the way to deliver print products to be printed (for example, delivering the whole print products at one time, delivering the print products in installments, delivering the print products individually to recipients, or distributing the print products), the deadline for delivering print products to be printed, and the degree of urgency of the need for print products to be printed. For example, print workflow software which supports a technical standard being developed by the graphic arts industry like Job Definition Format (JDF), uses the instruction parameters relating to printing services, and when receiving a pint job image through such the software, image forming apparatus 20 can refers to the instruction parameters relating to printing services.

Next, control unit 21 (print job analyzer 21a) analyzes the print job and obtains specifications for sheets to be used for printing, specified in the print job, and determines print products to be printed, for example, a certain number of copies of a print product or print products merged with respective variable data records (Step S102).

Next, control unit 21 (determiner 21c) uses the sheet specifications specified in the print job and the feed-tray information recorded in storage unit 25, to search for feed trays containing sheets that meet the conditions specified in the print job (Step S103). One of the feed trays found out in this step is primarily used for printing and is referred to as a primary feed tray. Control unit 21 (determiner 21c) makes this determination whether the sheets meet the conditions specified in the print job, by using specifications explicitly specified in the print job, and does not use other specifications for sheets, which are not explicitly specified in the print job, for the determination.

Next, control unit 21 (determiner 21c) uses a result of the analysis of the print job, to determine whether a change of the kind of sheets for printing at least one pages in the print products (in other words, a change of the kind of sheets used for printing, during printing pages of the print products), is acceptable (Step S104). Control unit 21 (determiner 21c) makes this determination whether the change of the kind of sheets for printing at least one page is acceptable, from operator's instructions directly input into image forming apparatus 20 through display and operation unit 27, or instruction parameters about printing services contained in the print job, such as the purpose of use of print products to be printed, the degree of urgency of the need of print products to be printed, and others. In a case that the purpose of use of print products to be printed is specified as personal purpose, it can be considered that the print products are not expected to have high quality, and control unit 21 (determiner 21c) determines that the change of the kind of sheets for printing at least one page is acceptable. In another case that the purpose of use is specified as commercial purpose, it can be considered that commercial value is important for the print products, and control unit 21 (determiner 21c) determines that the change of the kind of sheets for printing at least one page is not acceptable. In another case that print products to be printed are needed urgently and are expected to have reasonable quality, it can be considered that there is a need to complete printing of the print products in short time, and control unit 21 (determiner 21c) determines that the change of the kind of sheets for printing at least one page is acceptable.

When the change of the change of the kind of sheets for printing at least one page is acceptable (YES in Step S104), normal feed-tray change control can be used for printing the print job, and control unit 21 (print controller 21d) causes printing unit 29 to print the whole print job (Step 112). On the other hand, when the change of the kind of sheets for printing at least one page is not acceptable (NO in Step S104), control unit 21 (determiner 21c) searches for other feed trays containing sheets of the same kind as that of sheets contained in the priority tray, among the feed trays found out in Step S103, which contain sheets that meet the conditions specified in the print job (Step S105). Control unit 21 (determiner 21c) makes the determination whether the kind of sheets in a feed tray is the same as that of sheets in the priority tray, by using the detailed parameters relating to the appearance of sheets, without using parameters that do not almost relate to the appearance of sheets and parameters that relate to the feed trays. Examples of the detailed parameters relating to the appearance of sheets include the manufacturer of sheets, product name of sheets, product number of sheets, degree of whiteness of sheets, paper color of sheets, bleaching process of sheets, fluorescence process of sheets, transmissivity of sheets, reflectance of sheets, fiber density of sheets, textile of sheets, surface finishing of sheets, gloss of sheets, blending ratio of used paper of sheets, weight of sheets, thickness of sheets, size of sheets, and paper type of sheets. Examples of the parameters that do not almost relate to the appearance of sheets include the lot number of sheets, manufactured date of sheets, and intermediate wholesaler name of sheets. Examples of the parameters that relate to the feed trays include the positions and sheet-feed timing adjustment values of the feed trays.

Next, control unit 21 performs the following control operations for each of print products to be printed. At the beginning of printing one print product, control unit 21 (determiner 21c) uses the feed-tray information (reflecting the amount of sheets in each feed tray 30 monitored by control unit 21) to calculate the total sum of sheets in the priority tray and one or more feed trays containing sheets of the same kind as that of sheets in the priority tray (or the number of sheets in the priority tray if there is not any other feed tray containing the same kind of sheets). Control unit 21 (determiner 21c) further uses the analysis result of the print job to calculate the necessary amount of sheets for printing the print product, and compares the total sum of sheets in the feed tray or feed trays with the necessary amount of sheets for the print product (Step S106). In a case that the print job includes instructions to print a certain number of copies of a print product, one print product corresponds to one copy of the print product. In another case that the print job includes instructions to execute variable data printing by using variable data records, one print product corresponds to a print product merged with one of the variable data records.

When the comparison results in that the total sum of sheets in the feed tray or feed trays is not less than the necessary amount of sheets for printing the print product to be printed (YES in Step S106), control unit 21 (print controller 21d) causes printing unit 29 to print the print product (Step S107). Control unit 21 (print controller 21d) then judges whether printing on the basis of the print job has been completed (Step S108). When judging that the printing has not been completed (NO in Step S108), control unit 21 returns to Step 105 in the flowchart and repeats the succeeding processes for printing another print product.

When the comparison results in that the total sum of sheets in the feed tray or feed trays is less than the necessary amount of sheets for printing the print product to be printed (NO in Step S106), control unit 21 (determiner 21c) determines whether a change of the kind of sheets for printing at least one of the print products, is acceptable (Step S109). Control unit 21 (determiner 21c) makes this determination whether the change of the kind of sheets for printing at least one of the print products, is acceptable, from operator's instructions directly input into image forming apparatus 20 through display and operation unit 27, or parameters about printing services contained in the print job, such as the purpose of use of the print products to be printed, the way to deliver the print products to be printed, the deadline for delivering the print products to be printed, and the degree of urgency of the need for the print products to be printed. In a case that the print products to be printed are a certain type of print products to be individually delivered or distributed to end customers, like direct mails, leaflets or brochure, the print products will be handled by separate customers, and there fore, control unit 21 (determiner 21c) determines that the change of kind of sheets for printing at least one of the print products, is acceptable. In another case that the print products to be printed are those to be delivered to a customer at one time, for example, print products to be used by one person, control unit 21 (determiner 21c) determines that the change of kind of sheets for printing at least one of the print products, is not acceptable. In another case that the deadline for delivering the print products to be printed is approaching, control unit 21 (determiner 21c) determines that the change of kind of sheets for printing at least one of the print products, is acceptable.

When the change of kind of sheets for printing at least one of the print products, is not acceptable (NO in Step S109), continuation of the current printing can result in deterioration of commercial value of the print products. Therefore, control unit 21 (print controller 21d) causes printing unit 29 to suspend printing the print product to be printed and, if needed, control unit 21 (notifier 21e) causes display and operation unit 27 to display a message that prompts an operator to supply sheets into the feed tray being used for the printing or to change the feed tray being used for the printing, and waits for sheet supply or a change of the feed tray being used for printing (Step S113). On finding sheets supplied into the feed fray or the feed tray being used for the printing changed, control unit 21 returns to Step S105 in the flowchart and resumes the succeeding processes for printing remaining print products.

When determining that the change of kind of sheets for printing at least one of the print products, is acceptable (YES in Step S109), control unit 21 (determiner 21c) uses the analysis result of the print job and the feed-tray information, to search for other feed trays containing sheets that meet the conditions specified in the print job (Step S110). In this step, it is not necessary that control unit 21 (determiner 21c) searches for other feed trays containing sheets of the completely same kind as the kind of currently-used sheets, which is different from the process to search for feed trays in Step S103. Control unit 21 (determiner 21c) may search for feed trays containing sheets having a certain degree of difference which is not easily distinguished from the appearance, in, for example, texture, paper color, or paper weight, from the currently-used sheets. Control unit 21 (determiner 21c) may further search for feed trays containing sheets of the size different from that specified in the print job, as far as the contained sheets have sufficient size that can be used at last for printing and finishing print products. For example, in a case that the print job contains specifications relating to post processing, like cutting, another case that the print job contains specification parameters relating to printing services, which specify to cut printed sheets in post processing, or another case that control unit 21 has found a cut mark in print data, which is supposed to indicate a need of a cutting process, control unit 21 (determiner 21c) may search for a feed tray containing sheets of the size greater than the sum of the size specified for the print products and the size of margin necessary for cutting printed sheets down to the size specified for the print products, and use the feed tray as that meets the conditions specified in the print job. For example, in the case that the print job includes specifications to bind printed sheets by using a saddle stitch, which is popularly used for weekly magazines, one set of printed sheets are bound and then cut into one print product. Therefore, a use of different sizes of sheets for printing one print product makes difficulties in the binding process, but a use of different sizes of sheets for printing print products separately, makes less difficulties in the biding process.

When control unit 21 (determiner 21c) has not found any other feed trays containing sheets that meet the conditions specified in the print job (NO in Step S110), control unit 21 (print controller 21d) causes printing unit 20 to suspend printing the print product to be printed and, if needed, control unit 21 (notifier 21e) causes display and display and operation unit 27 to display a message that prompts an operator to supply sheets into the feed tray being used for the printing, and waits for sheet supply (Step S113). On finding sheets supplied into the feed fray, control unit 21 returns to Step S105 in the flowchart and resumes the succeeding processes for printing remaining print products.

When control unit 21 (determiner 21c) has found any other feed trays containing sheets that meet the conditions specified in the print job (YES in Step S110), control unit 21 (print controller 21d) changes the feed tray used for the printing, from the priority tray to the feed tray found out (Step S111). Control unit 21 then returns to Step S105 in the flowchart and resumes the succeeding processes for printing remaining print products. After changing the kind of sheets for printing at least one of the print products, control unit 21 may record information about the change into an output log file, or cause printing unit 29, immediately after the change, to print an insert page indicating that the kind of sheets has been changed, so as to inform an operator about the change.

A description of the print control is given below, by using concrete examples. FIGS. 7A to 7C and FIGS. 8A to 8A are schematic diagrams for comparing and illustrating the above-described print control and a conventional print control.

First, there is given an example such that image funning apparatus 20 receives and process a print job including instructions to print eight copies of a 100-page document on color sheets. In this example, as illustrated in FIG. 7A, image forming apparatus 20 has feed tray 1 containing 250 color sheets (named "HiColor" given by Manufacturer A) and feed tray 2 containing 700 color sheets (named "Color+" given by Manufacturer B). In this example, feed tray 1 is set as the priority tray, and a change of kind of sheets for printing at least one of print products, is acceptable.

In the above-described print control, which is illustrated by FIG. 7B, under the condition that there is no feed tray containing sheets the kind of which does not completely meet that specified in the print job in Step S105, control unit 21 determines that the amount of sheets in feed tray 1 (250 sheets) is not less than the necessary amount of sheets for printing a copy of the document (100 pages, 100 sheets) (YES in Step S106). Therefore, control unit 21 causes printing unit 29 to print the first and second copies of the document (Step S107). At the time when the second copy has been printed, 50 sheets remain in feed tray 1. Since the amount of sheets in feed tray 1 (50 sheets) is less than the necessary amount of sheets for printing a copy of the document to be printed next to the second copy (100 pages, 100 sheets) (NO in Step S106), control unit 21 determines whether a change of kind of sheets for printing at least one of the print products, is acceptable (Step S109). In this example, the change of kind of sheets for printing at least one of the print products, is acceptable, and control unit 21 searches for other feed trays containing sheets that meets the conditions specified in the print job (Step S110). As can be seen from feed-tray information in FIG. 6, both "HiColor" sheets given by manufacturer A and "Color+" sheets given by manufacturer B are color sheets, and feed tray 2 contains sheets that meets the conditions. Therefore, control unit 21 changes a feed tray used for the printing, from feed tray 1 to feed tray 2 (Step S111). Returning to Step S105, control unit 21 prints the third to eighth copies of the document (Step S107). After the printing, 50 sheets remain in feed tray 1 and 100 sheets remain in feed tray 2.

In a conventional print control, which is illustrated by FIG. 7C, control unit 21 causes printing unit 29 to print the first and second copies in the same manner as the print control illustrated in FIG. 7B. However, 50 sheets remain in feed tray 1 at the beginning of printing the third copy; and feed tray 1 becomes empty during printing the third copy. Control unit 21 then changes the feed tray used for the printing, from feed tray 1 to feed tray 2, to resume the printing. As a result, the third copy printed by using two kinds of sheets: "HiColor" given by manufacturer A and "Color+" given by manufacturer B is given.

As described above, under the condition that a change of kind of sheets for printing at least one of the print products, is acceptable, the print control determines whether to change the feed tray being used for printing, according to the amounts of sheets in feed trays, at the beginning of printing each print product. It avoids mixture of sheets, which meet the conditions specified in the print job but are different in kind, in each print product. Further, the print control allows implementation of redundancy of sheet suppliers, without sacrificing the commercial value of print products created.

Figure 8A:
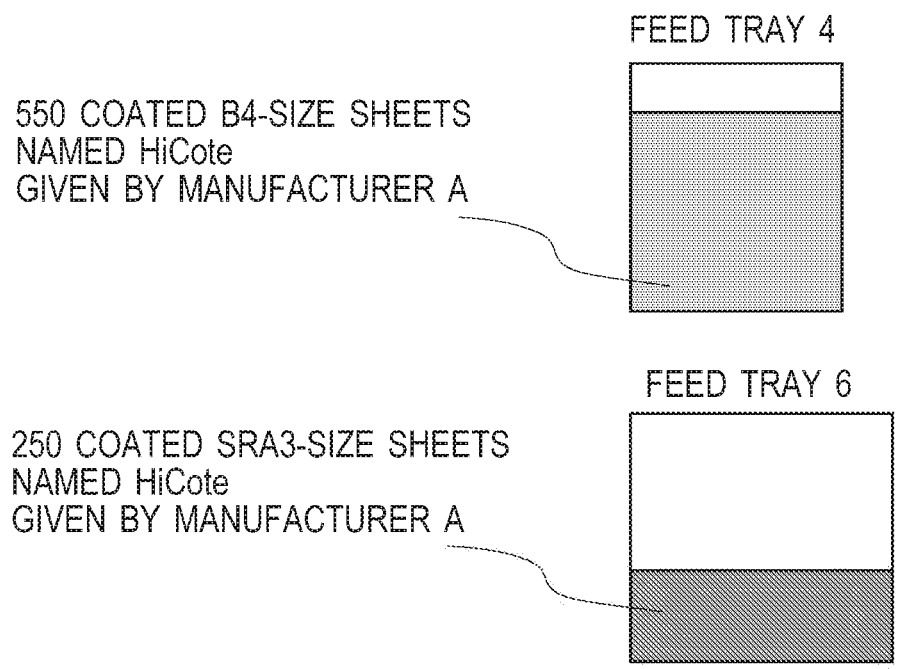

The example illustrated in FIGS. 7A to 7C employs image forming apparatus 20 including multiple feed trays each containing sheets of the size specified in a print job. In another example that a print job includes specifications relating to post processing (finishing), like a specification to print a cut mark together with document data, image forming apparatus 20 can also execute printing by using the disclosed print control, as far as the image forming apparatus 20 includes multiple feed trays containing sheets of the size being greater than that specified in a print job. In the example, image forming apparatus 20 receives and process a print job including instructions to print seven copies of a 100-page document together with cut marks indicating A4 page size, on coated sheets. As illustrated in FIG. 8A, image forming apparatus 20 has feed tray 4 containing 550 coated B4-size sheets (named "HiCote" given by Manufacturer A) and feed tray 6 containing 250 coated SRA3-size (supplementary raw format A3 size) sheets (named "Color+" given by Manufacturer B). In this example, feed tray 4 is set as the priority tray, and a change of kind of sheets for printing at least one of print products, is acceptable.

In the above-described print control, which is illustrated by FIG. 8B, under the condition that there is no feed tray containing sheets the kind of which does not completely meet that specified in the print job in Step S105, control unit 21 determines that the amount of sheets in feed tray 4 (550 sheets) is not less than the necessary amount of sheets for printing a copy of the document (100 pages, 100 sheets) (YES in Step S106). Therefore, control unit 21 causes printing unit 29 to print the first to fifth copies of the document (Step S107). At the time when the fifth copy has been printed, 50 sheets remain in feed tray 4. Since the amount of sheets in feed tray 4 (50 sheets) is less than the necessary amount of sheets for printing a copy of the document to be printed next to the fifth copy (100 pages, 1100 sheets) (NO in Step S106), control unit 21 determines whether a change of kind of sheets for printing at least one of the print products, is acceptable (Step S109). In this example, a change of kind of sheets for printing at least one of the print products, is acceptable, and control unit 21 searches for other feed trays containing sheets that meets the conditions specified in the print job (Step S110). As can be seen from the feed-tray information in FIG. 6, feed tray 4 and feed tray 6 contain coated B4-size sheets and coated SRA3-size sheets, respectively. The sheets in the feed trays are both named "HiCote" and given by manufacturer A, but are different in size. Since the size of sheets in the feed trays are greater than the document size of A4 and the print job includes a specification to print cut marks together with document data. A4-size print product can be obtained by trimming printed SRA3-size sheets down into A4 size in post processing or a cutting process to be executed after printing. Therefore, control unit 21 determines that feed tray 6 meets the conditions specified in the print job in Step S110, and changes a feed tray used for the printing, from feed tray 4 to feed tray 6 (Step S111). Returning to Step S105, control unit 211 prints the sixth and seventh copies of the document (Step S107). After the printing, 50 sheets remain in feed tray 4 and 50 sheets remain in feed tray 6.

In a conventional print control, which is illustrated by FIG. 8C, control unit 21 causes printing unit 29 to print the first to fifth copies in the same manner as the print control illustrated in FIG. 8B. However, 50 sheets remain in feed tray 4 at the beginning of printing the sixth copy, and feed tray 4 becomes empty during printing the sixth copy. Control unit 21 then causes printing unit 29 to suspend printing the sixth copy or changes a feed tray used for printing, from feed tray 4 to feed tray 6, to resume the printing. The print control to suspend printing delays completion of the printing and makes implementation of redundancy of sheet suppliers difficult. The print control to change a feed tray being used for printing, to feed tray 6 during printing the sixth copy results in that the sixth copy is printed by using coated B4-size sheets in feed tray 4 and coated. SRA3-size sheets in feed tray 6. It makes difficulties in cutting the printed sheets in post processing or a cutting process to be executed after printing.

As described above, under the condition that a change of kind of sheets for printing at least one of the print products, is acceptable, the print control determines whether to change the feed tray being used for printing, according to the amounts of sheets in feed trays, at the beginning of printing each print product. It avoids difficulties which will arise in post processing or a cutting process to be executed after printing because of mixture of sheets which meet the conditions specified in the print job but are different in kind, in each print product. Further, the print control allows implementation of redundancy of sheet suppliers, without sacrificing the commercial value of print products created.

It should be noted that the present invention should not be limited to the above-described example, and the constitution and the method of print control can be modified appropriately, unless the modification deviates from the intention of the present invention.

The above-described examples give the print control to determine whether to change a feed tray (or the kind of sheets) being used for printing, on printing each print product (in other words, the print control using a print job that includes specifications to print a certain number of copies of a print product). Alternatively, the print control may be applied to variable data printing based on a print job including specifications to execute variable data printing by using variable data records. That is, the print control may determine whether to change a feed tray (or the kind of sheets) being used for printing, on printing each print product merged with one of variable data recodes, which allows creation of print products without sacrificing the commercial value.

Further, the print control may be applied to an image forming apparatus such that the control unit (or one or more hardware processor) is configured to analyze a print job to determine print products to be printed, so as to execute print control to determine whether to suspend printing a print product to be printed next to a print product currently being printed, according to the amounts of sheets in feed trays, each time to print a print product. In concrete terms, the control unit (or one or more hardware processor) is configured to monitor the amount of sheets in each feed tray, to determine, for each of the print products to be printed, whether the amount of sheets contained in a feed tray being used for printing at the beginning of printing the each print product, is not less than the necessary amount of sheets for printing the each print product, and causing the print engine to print the print products. During printing the print products, when determining that the amount of sheets in the feed tray being used for printing, determined for a next print product, which is a print product to be printed next to a print product currently being printed, is less than the necessary amount of sheets for printing the next print product, the control unit (or one or more hardware processor) causes the print engine to suspend printing the next print product. Since this print control determines whether to suspend printing the next print product each time to print a print product, it allows the image forming apparatus to prompt an operator to supply appropriate sheets into a feed tray or change a feed tray being used for printing, before the feed tray becomes empty during printing a print product, by presenting an operator a message through a display unit during the suspension. It also avoids mixture of different kinds of sheets in each print product, and also allows implementation of redundancy of sheet suppliers, without sacrificing the commercial value of print products created.

The present invention is applicable to image forming apparatuses equipped with multiple feed trays on which different kinds of sheets are loaded separately, computer-readable programs for print control relating to a change of feed trays in an image forming apparatus, non-transitory recording media each storing the computer-readable program for print control, and a print control method.

Although embodiments of the present invention have been described and illustrated in detail, it is clearly understood that the same is by way of illustration and example only and not limitation, the scope of the present invention should be interpreted by terms of the appended claims.

The invention claimed is:

1. An image forming apparatus which can change a feed tray being used for printing to another feed tray during the printing, the image forming apparatus comprising:
   a plurality of feed trays;
   a print engine that prints according to a print job on sheets fed from one of the plurality of feed trays; and
   at least one hardware processor that performs operations including:
      analyzing a print job to determine plural individual print products to be printed, the print products being included in the print job, and each of the print products including at least one page;

on finding two or more feed trays separately containing different kinds of sheets that meet conditions for sheets specified in the print job, among the plurality of feed trays, monitoring an amount of sheets in each of the plurality of feed trays, to determine, for each of the print products, whether an amount of sheets contained at a beginning of printing the each of the print products in one or more feed trays, which contain sheets of same kind as sheets being used for printing, among the plurality of feed trays, is not less than a necessary amount of sheets for printing the each of the print products; and causing the print engine to print each of the print products, wherein the causing the print engine to print each of the print products includes, on determining that the amount of sheets in the one or more feed trays, determined for a next print product, which is a print product to be printed next after a print product currently being printed, is less than the necessary amount of sheets for printing the next print product, selectively performing one of (i) causing the print engine to suspend printing the next print product, and (ii) changing the feed tray being used for the printing to another feed tray among the two or more feed trays, the another feed tray containing sheets an amount of which is not less than the necessary amount of sheets for printing the next print product.

2. The image forming apparatus of claim 1, further comprising a display, wherein the operations further include, on causing the print engine to suspend printing the next print product, causing the display to display a message which prompts an operator to supply sheets to the feed tray being used for the printing or prompts an operator to change the feed tray being used for the printing to another of the plurality of feed trays, so as to inform the operator about the message.

3. The image forming apparatus of claim 2, further comprising a storage, wherein the operations further include, on changing the feed tray being used for the printing to another feed tray, selectively performing one of:

recording a message that the feed tray being used for the printing has been changed, in the storage; and causing the display to display a message that the feed tray being used for the printing has been changed, so as to inform the operator about the message.

4. The image forming apparatus of claim 1, wherein the operations further include, on determining that the amount of sheets in the one or more feed trays, determined for the next print product, is less than the necessary amount of sheets for printing the next print product, determining whether a change of a kind of sheets for printing at least one of the print products, is acceptable, and wherein the selectively performing one of the causing the print engine to suspend printing the next print product and the changing the feed tray being used for the printing includes (i) on determining that the change is not acceptable, causing the print engine to suspend printing the next print product, and (ii) on determining that the change is acceptable, changing the feed tray being used for the printing to the another feed tray to resume printing the next print product.

5. The image forming apparatus of claim 4, wherein the determining whether the change is acceptable includes using at least one of a purpose of use of the print products, a way to deliver the print products, a deadline for delivery of the print products, and a degree of urgency of a need for the print product, to determine whether the change is acceptable.

6. The image forming apparatus of claim 5, wherein the purpose of use of the print products is one of a personal purpose, an office purpose, a proportional purpose, and a commercial purpose.

7. The image forming apparatus of claim 5, wherein the way to deliver the print products is one of delivering all of the print products at one time, delivering the print products in installments, delivering the print products individually to recipients, and distributing the print products.

8. The image forming apparatus of claim 1, wherein the operations further include, on finding a cut mark in the print products to be printed or a specification relating to cutting the print products specified in the print job:

comparing a size of sheets in each of the plurality of feed trays with a size specified for the print products;

finding at least one feed tray, among the two or more feed trays, containing sheets of a size greater than a sum of the size specified for the print products and a size of a margin necessary for cutting printed sheets down to the size specified for the print products; and using the at least one feed tray to find the another feed tray.

9. The image forming apparatus of claim 1, wherein the operations further include determining a difference in a kind of sheets between the plurality of feed trays, by using at least one of a manufacturer of sheets, a product name of sheets, a product number of sheets, a degree of whiteness of sheets, a paper color of sheets, a bleaching process of sheets, a fluorescence process of sheets, a transmissivity of sheets, a reflectance of sheets, a fiber density of sheets, a textile of sheets, a surface finishing of sheets, a gloss of sheets, a blending ratio of used paper of sheets, a weight of sheets, a thickness of sheets, a size of sheets, and a paper type of sheets.

10. The image foraging apparatus of claim 1, wherein the operations further include determining a difference in a kind of sheets between the plurality of feed trays without using a lot number of sheets, a manufactured date of sheets, a name of an intermediate wholesaler of sheets, positions of the plurality of feed trays, and sheet-feed timing adjustment values of the plurality of feed trays.

11. The image forming apparatus of claim 1, wherein the analyzing includes:

on analyzing, as the print job, a print job including a specification to print a plurality of copies of a certain print product, determining the plurality of copies of the certain print product as the print products to be printed; and on analyzing, as the print job, a print job including a specification to execute variable data printing by using variable data records, determining print products merged with the respective variable data records as the print products to be printed.

12. A non-transitory recording medium storing a computer-readable program for print control, to be executed in an image forming apparatus which can change a feed tray being used for printing to another feed tray during the printing, the image forming apparatus comprising a plurality of feed trays, a print engine that prints according to a print job on sheets fed from one of the plurality of feed trays, and at least one hardware processor, the program comprising instructions which, when executed by the at least one hardware processor, cause the image forming apparatus to perform operations comprising:

analyzing a print job to determine plural individual print products to be printed, the print products being included in the print job, and each of the print products including at least one page;

on finding two or more feed trays separately containing different kinds of sheets that meet conditions for sheets specified in the print job, among the plurality of feed trays, monitoring an amount of sheets in each of the plurality of feed trays, to determine, for each of the print products, whether an amount of sheets contained at a beginning of printing the each of the print products in one or more feed trays, which contain sheets of same kind as sheets being used for printing, among the plurality of feed trays, is not less than a necessary amount of sheets for printing the each of the print products; and causing the print engine to print each of the print products, wherein the causing the print engine to print each of the print products includes, on determining that the amount of sheets in the one or more feed trays, determined for a next print product, which is a print product to be printed next after a print product currently being printed, is less than the necessary amount of sheets for printing the next print product, selectively performing one of (i) causing the print engine to suspend printing the next print product, and (ii) changing the feed tray being used for the printing to another feed tray among the two or more feed trays, the another feed tray containing sheets an amount of which is not less than the necessary amount of sheets for printing the next print product.

13. The non-transitory recording medium of claim 12, wherein the image forming apparatus further includes a display, and the operations further comprise, on causing the print engine to suspend printing the next print product, causing the display to display a message which prompts an operator to supply sheets to the feed tray being used for the printing or prompts an operator to change the feed tray being used for the printing to another of the plurality of feed trays, so as to inform the operator about the message.

14. The non-transitory recording medium of claim 13, wherein the image forming apparatus further includes a storage, and the operations further comprise, on changing the feed tray being used for the printing to another feed tray, selectively performing one of:

recording a message that the feed tray being used for the printing has been changed, in the storage; and causing the display to display a message that the feed tray being used for the printing has been changed, so as to inform the operator about the message.

15. The non-transitory recording medium of claim 12, wherein the operations further comprise, on determining that the amount of sheets in the one or more feed trays, determined for the next print product, is less than the necessary amount of sheets for printing the next print product, determining whether a change of a kind of sheets for printing at least one of the print products, is acceptable, and wherein the selectively performing one of the causing the print engine to suspend printing the next print product and the changing the feed tray being used for the printing includes (i) on determining that the change is not acceptable, causing the print engine to suspend printing the next print product, and (ii) on determining that the change is acceptable, changing the feed tray being used for the printing to the another feed tray to resume printing the next print product.

16. The non-transitory recording medium of claim 15, wherein the determining whether the change is acceptable includes using at least one of a purpose of use of the print products, a way to deliver the print products, a deadline for delivery of the print products, and a degree of urgency of a need for the print product, to determine whether the change is acceptable.

17. The non-transitory recording medium of claim 16, wherein the purpose of use of the print products is one of a personal purpose, an office purpose, a promotional purpose, and a commercial purpose.

18. The non-transitory recording medium of claim 16, wherein the way to deliver the print products is one of delivering all of the print products at one time, delivering the print products in installments, delivering the print products individually to recipients, and distributing the print products.

19. The non-transitory recording medium of claim 12, wherein the operations further comprise, on finding a cut mark in the print products to be printed or a specification relating to cutting the print products specified in the print job:

comparing a size of sheets in each of the plurality of feed trays with a size specified for the print products;

finding at least one feed tray, among the two or more feed trays, containing sheets of a size greater than a sum of the size specified for the print products and a size of a margin necessary for cutting printed sheets down to the size specified for the print products; and using the at least one feed tray to find the another feed tray.

20. The non-transitory recording medium of claim 12, wherein the operations further comprise determining a difference in a kind of sheets between the plurality of feed trays, by using at least one of a manufacturer of sheets, a product name of sheets, a product number of sheets, a degree of whiteness of sheets, a paper color of sheets, a bleaching process of sheets, a fluorescence process of sheets, a transmissivity of sheets, a reflectance of sheets, a fiber density of sheets, a textile of sheets, a surface finishing of sheets, a gloss of sheets, a blending ratio of used paper of sheets, a weight of sheets, a thickness of sheets, a size of sheets, and a paper type of sheets.

21. The non-transitory recording medium of claim 12, wherein the operations further comprise determining a difference in a kind of sheets between the plurality of feed trays without using a lot number of sheets, a manufactured date of sheets, a name of an intermediate wholesaler of sheets, positions of the plurality of feed trays, and sheet-feed timing adjustment values of the plurality of feed trays.

22. The non-transitory recording medium of claim 12, wherein the analyzing includes:

on analyzing, as the print job, a print job including a specification to print a plurality of copies of a certain print product, determining the plurality of copies of the certain print product as the print products to be printed; and on analyzing, as the print job, a print job including a specification to execute variable data printing by using variable data records, determining print products merged with the respective variable data records as the print products to be printed.

23. An image forming apparatus which can change a feed tray being used for printing to another feed tray during the printing, the image forming apparatus comprising:
- a plurality of feed trays;
- a print engine that prints according to a print job on sheets fed from one of the plurality of feed trays; and
- one or more hardware processors that perform operations including:
  - analyzing a print job to determine print products to be printed;
  - on finding two or more feed trays separately containing different kinds of sheets that meet conditions for sheets specified in the print job, among the plurality of feed trays, monitoring an amount of sheets in each of the plurality of feed trays, to determine, for each of the print products, whether an amount of sheets contained at a beginning of printing the each of the print products in one or more feed trays, which contain sheets of same kind as sheets being used for printing, among the plurality of feed trays, is not less than a necessary amount of sheets for printing the each of the print products;
  - causing the print engine to print each of the print products, wherein the causing the print engine to print each of the print products includes, on determining that the amount of sheets in the one or more feed trays, determined for a next print product, which is a print product to be printed next after a print product currently being printed, is less than the necessary amount of sheets for printing the next print product, performing one of (i) causing the print engine to suspend printing the next print product, and (ii) changing the feed tray being used for the printing to another feed tray among the two or more feed trays, the another feed tray containing sheets an amount of which is not less than the necessary amount of sheets for printing the next print product; and
  - on finding a cut mark in the print products to be printed or a specification relating to cutting the print products specified in the print job, (i) comparing a size of sheets in each of the plurality of feed trays with a size specified for the print products, (ii) finding at least one feed tray, among the two or more feed trays, containing sheets of a size greater than a sum of the size specified for the print products and a size of a margin necessary for cutting printed sheets down to the size specified for the print products, and (iii) using the at least one feed tray to find the another feed tray.

24. A non-transitory recording medium storing a computer-readable program for print control, to be executed in an image forming apparatus which can change a feed tray being used for printing to another feed tray during the printing, the image forming apparatus comprising a plurality of feed trays, a print engine that prints according to a print job on sheets fed from one of the plurality of feed trays, and one or more hardware processors, the program comprising instructions which, when executed by the one or more hardware processors, cause the image forming apparatus to perform operations comprising:
- analyzing a print job to determine print products to be printed;
- on finding two or more feed trays separately containing different kinds of sheets that meet conditions for sheets specified in the print job, among the plurality of feed trays, monitoring an amount of sheets in each of the plurality of feed trays, to determine, for each of the print products, whether an amount of sheets contained at a beginning of printing the each of the print products in one or more feed trays, which contain sheets of same kind as sheets being used for printing, among the plurality of feed trays, is not less than a necessary amount of sheets for printing the each of the print products;
- causing the print engine to print each of the print products, wherein the causing the print engine to print each of the print products includes, on determining that the amount of sheets in the one or more feed trays, determined for a next print product, which is a print product to be printed next after a print product currently being printed, is less than the necessary amount of sheets for printing the next print product, performing one of (i) causing the print engine to suspend printing the next print product, and (ii) changing the feed tray being used for the printing to another feed tray among the two or more feed trays, the another feed tray containing sheets an amount of which is not less than the necessary amount of sheets for printing the next print product; and
- on finding a cut mark in the print products to be printed or a specification relating to cutting the print products specified in the print job, (i) comparing a size of sheets in each of the plurality of feed trays with a size specified for the print products, (ii) finding at least one feed tray, among the two or more feed trays, containing sheets of a size greater than a sum of the size specified for the print products and a size of a margin necessary for cutting printed sheets down to the size specified for the print products, and (iii) using the at least one feed tray to find the another feed tray.

* * * * *